United States Patent
Krans et al.

(10) Patent No.: US 9,088,688 B2
(45) Date of Patent: Jul. 21, 2015

(54) SYSTEM AND METHOD FOR COLLABORATION REVELATION AND PARTICIPANT STACKING IN A NETWORK ENVIRONMENT

(75) Inventors: Pär-Erik Krans, Drammen (NO); Fredrik E. M. Oledal, Oslo (NO); Norma Løvhaugen, Asker (NO); Johan Ludvig Nielsen, Oslo (NO); Lasse S. Thoresen, Oslo (NO); Dan Peder Eriksen, Oslo (NO)

(73) Assignee: CISCO TECHNOLOGY, INC., San Jose, CA (US)

(*) Notice: Subject to any disclaimer, the term of this patent is extended or adjusted under 35 U.S.C. 154(b) by 150 days.

(21) Appl. No.: 13/604,220

(22) Filed: Sep. 5, 2012

(65) Prior Publication Data

US 2014/0063178 A1    Mar. 6, 2014

(51) Int. Cl.
H04N 7/14 (2006.01)
H04N 7/15 (2006.01)

(52) U.S. Cl.
CPC . *H04N 7/142* (2013.01); *H04N 7/15* (2013.01)

(58) Field of Classification Search
USPC .................................. 348/14.01, 14.07, 14.08
See application file for complete search history.

(56) References Cited

U.S. PATENT DOCUMENTS

| | | | |
|---|---|---|---|
| 5,671,019 A | 9/1997 | Isoe | |
| 6,081,262 A | 6/2000 | Gill et al. | |
| 6,177,958 B1 | 1/2001 | Anderson | |
| 6,285,408 B1 | 9/2001 | Choi et al. | |
| 6,377,309 B1 | 4/2002 | Ito et al. | |
| 6,549,199 B1 | 4/2003 | Carter et al. | |
| 6,704,060 B2 | 3/2004 | Levandowski | |
| 6,718,308 B1 | 4/2004 | Nolting | |
| 6,772,204 B1 | 8/2004 | Hansen et al. | |
| 7,712,117 B1 | 5/2010 | Mohr | |
| 7,920,158 B1 * | 4/2011 | Beck et al. ................ | 348/14.08 |
| 8,294,823 B2 | 10/2012 | Ciudad et al. | |
| 8,421,843 B2 | 4/2013 | Gachignard | |
| 8,665,309 B2 | 3/2014 | Ferren | |
| 8,693,648 B1 * | 4/2014 | Drugge et al. ............. | 379/93.21 |
| 2003/0140101 A1 | 7/2003 | Kunugi et al. | |
| 2006/0087987 A1* | 4/2006 | Witt et al. ..................... | 370/260 |

(Continued)

FOREIGN PATENT DOCUMENTS

| | | |
|---|---|---|
| EP | 1564682 | 8/2005 |
| NO | 333184 | 3/2013 |

OTHER PUBLICATIONS

U.S. Appl. No. 13/595,689, filed Aug. 27, 2012 entitled "System and Method for Collaborator Representation in a Network Environment," Inventors: Pär-Erik Krans, et al., 32 pages.

(Continued)

*Primary Examiner* — Olisa Anwah
(74) *Attorney, Agent, or Firm* — Patent Capital Group

(57) ABSTRACT

A method is provided in one example embodiment and includes receiving video data associated with a meeting in a video conferencing environment; and displaying a plurality of images of participants of the meeting around a presenter or around collaboration material such that an overview of the participants is rendered on a display. The presenter or the collaboration material is rendered near a middle portion of the display. At least some of the participants are at one or more locations, which are remote from the display.

20 Claims, 8 Drawing Sheets

(56) References Cited

U.S. PATENT DOCUMENTS

| | | | |
|---|---|---|---|
| 2007/0097266 A1 | 5/2007 | Souchard | |
| 2008/0106625 A1 | 5/2008 | Border et al. | |
| 2010/0007665 A1 | 1/2010 | Smith et al. | |
| 2010/0124941 A1 | 5/2010 | Cho | |
| 2010/0159430 A1 | 6/2010 | Lee et al. | |
| 2010/0183240 A1 | 7/2010 | Hiraga et al. | |
| 2010/0302446 A1 | 12/2010 | Mauchly et al. | |
| 2011/0103624 A1* | 5/2011 | Ferren | 381/306 |
| 2011/0115876 A1* | 5/2011 | Khot et al. | 348/14.09 |
| 2011/0310214 A1 | 12/2011 | Saleh et al. | |
| 2012/0206558 A1 | 8/2012 | Setton | |
| 2012/0249719 A1* | 10/2012 | Lemmey et al. | 348/14.01 |
| 2013/0002794 A1* | 1/2013 | Hines et al. | 348/14.01 |
| 2013/0070045 A1* | 3/2013 | Meek | 348/14.07 |
| 2013/0155169 A1* | 6/2013 | Hoover et al. | 348/14.02 |
| 2014/0169666 A1 | 6/2014 | Hong | |

OTHER PUBLICATIONS

Raja Gumienny, et al., "Tele-Board: Enabling Efficient Collaboration in Digital Design Spaces Across Time and Distance," Springer-Verlag, Berlin Heidelberg © 2011, 19 pages; http://www.springerlink.com/content/185087518r8t8486/?MUD=MP.

John C. Tang, et al., "Videowhiteboard: Video Shadows to Support Remote Collaboration," © 1999, 8 pages; http://www.hcitang.org/uploads/Teaching/videowhiteboard.pdf.

YouTube, "Polycom People on Content," [retrieved and printed on Aug. 27, 2012], 2 pages; http://www.youtube.com/watch?v=XPEER8E2XDw&feature=related.

USPTO Jul. 23, 2014 Non-Final Office Action from U.S. Appl. No. 13/595,689.

USPTO Dec. 9, 2014 Final Rejection from U.S. Appl. No. 13/595,689.

USPTO Apr. 28, 2015 Non-Final Office Action from U.S. Appl. No. 13/595,689.

* cited by examiner

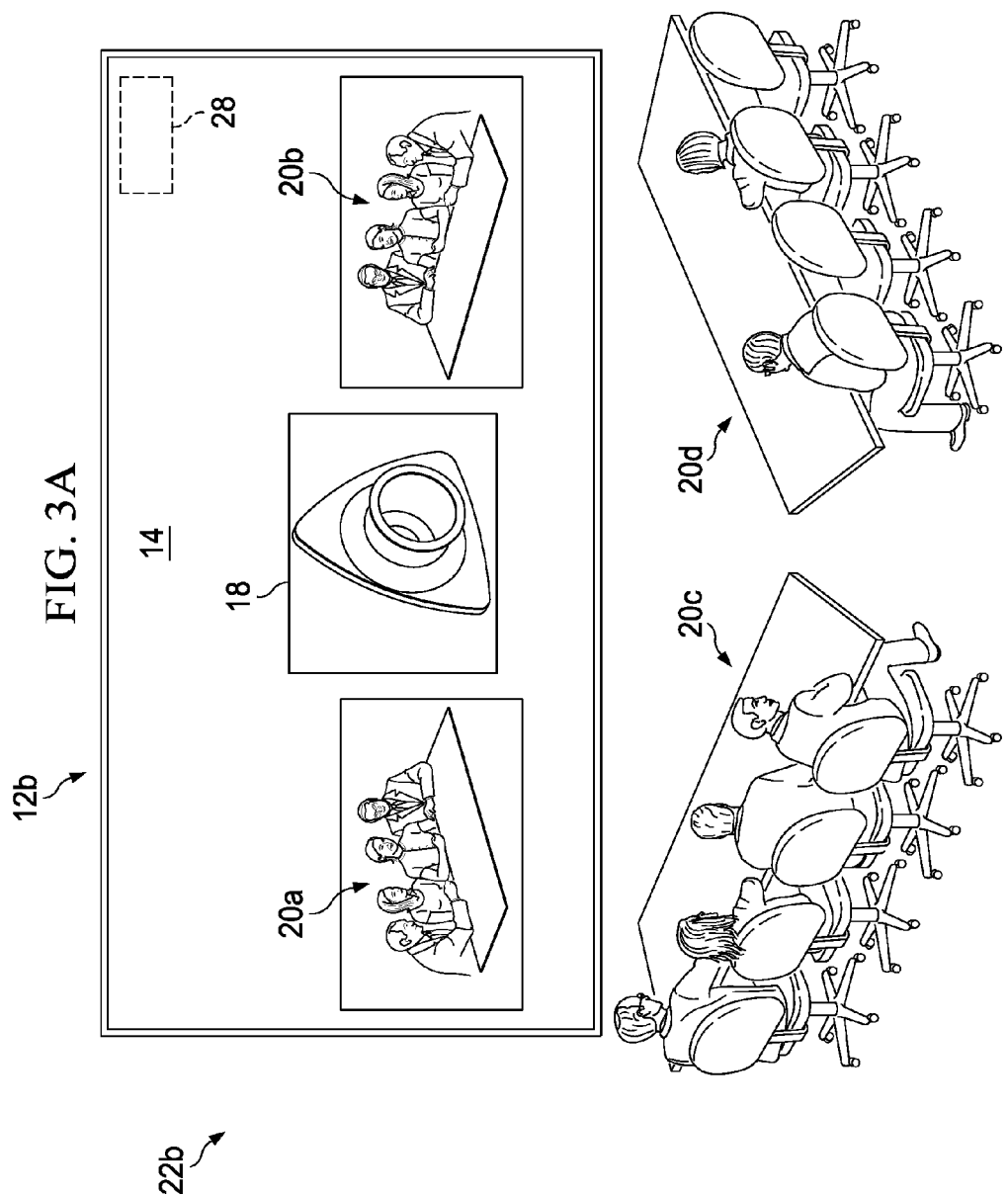

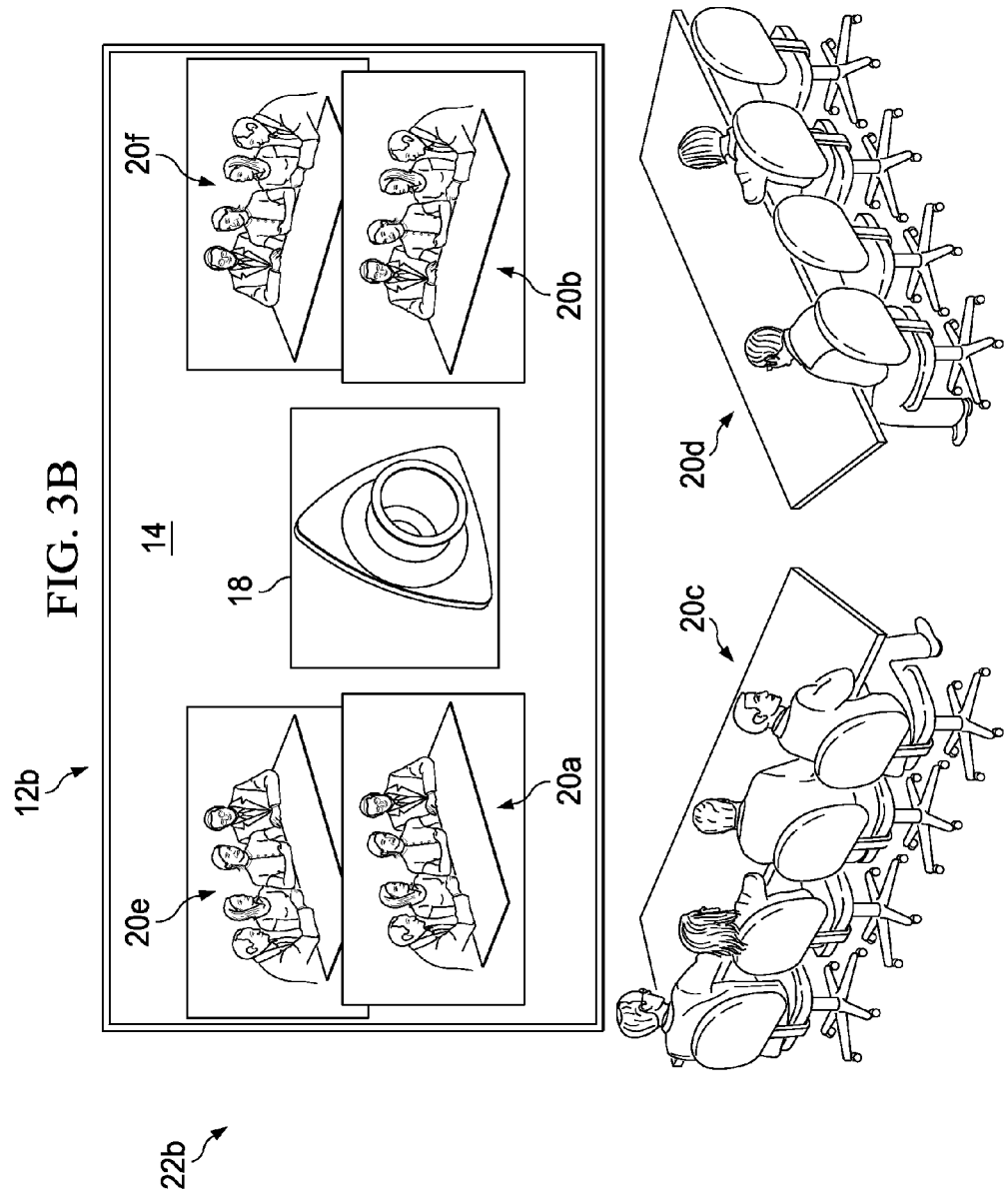

US 9,088,688 B2

SYSTEM AND METHOD FOR COLLABORATION REVELATION AND PARTICIPANT STACKING IN A NETWORK ENVIRONMENT

TECHNICAL FIELD

This disclosure relates in general to the field of communications and, more particularly, to collaboration revelation and participant stacking in a network environment.

BACKGROUND

Video services have become increasingly important in today's society. In certain architectures, service providers may seek to offer sophisticated video conferencing services for their participants. The video conferencing architecture can offer an "in-person" meeting experience over a network. Video conferencing architectures can deliver real-time, face-to-face interactions between people using advanced visual, audio, and collaboration technologies. The ability to optimize video communications provides a significant challenge to system designers, device manufacturers, and service providers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3A is a simplified block diagram in accordance with another embodiment of the present disclosure;

FIG. 3B is a simplified block diagram in accordance with another embodiment of the present disclosure;

DETAILED DESCRIPTION OF EXAMPLE EMBODIMENTS

Overview

A method is provided in one example embodiment and includes receiving video data associated with a meeting in a video conferencing environment; and displaying a plurality of images of participants of the meeting around a presenter or around collaboration material such that an overview of the participants is rendered on a display. The presenter or the collaboration material is rendered near a middle portion of the display. At least some of the participants are at one or more locations, which are remote from the display.

In more detail implementations, the method can include stacking the plurality of images to create the overview of the participants of the meeting. In addition, a first image of a first one of the participants is partially behind a second image of a second one of the participants. The plurality of images can be blended and shaded to indicate an importance thereof or a distance from the display. The method can also include displaying a non-mirror image of the collaboration material on the display. The method can further include configuring the middle portion of the display in a seamless transition in order to accommodate the presenter or the collaboration material.

Directional audio can be provided for the meeting to assist the participants in perception capabilities associated with the meeting. In addition, shared content of the meeting can be accommodated during collaboration activities via a touch sensitive wall area. A presence of at least one of the participants in front of the display can be detected during the collaboration activities.

Example Embodiments

Figure 1A:
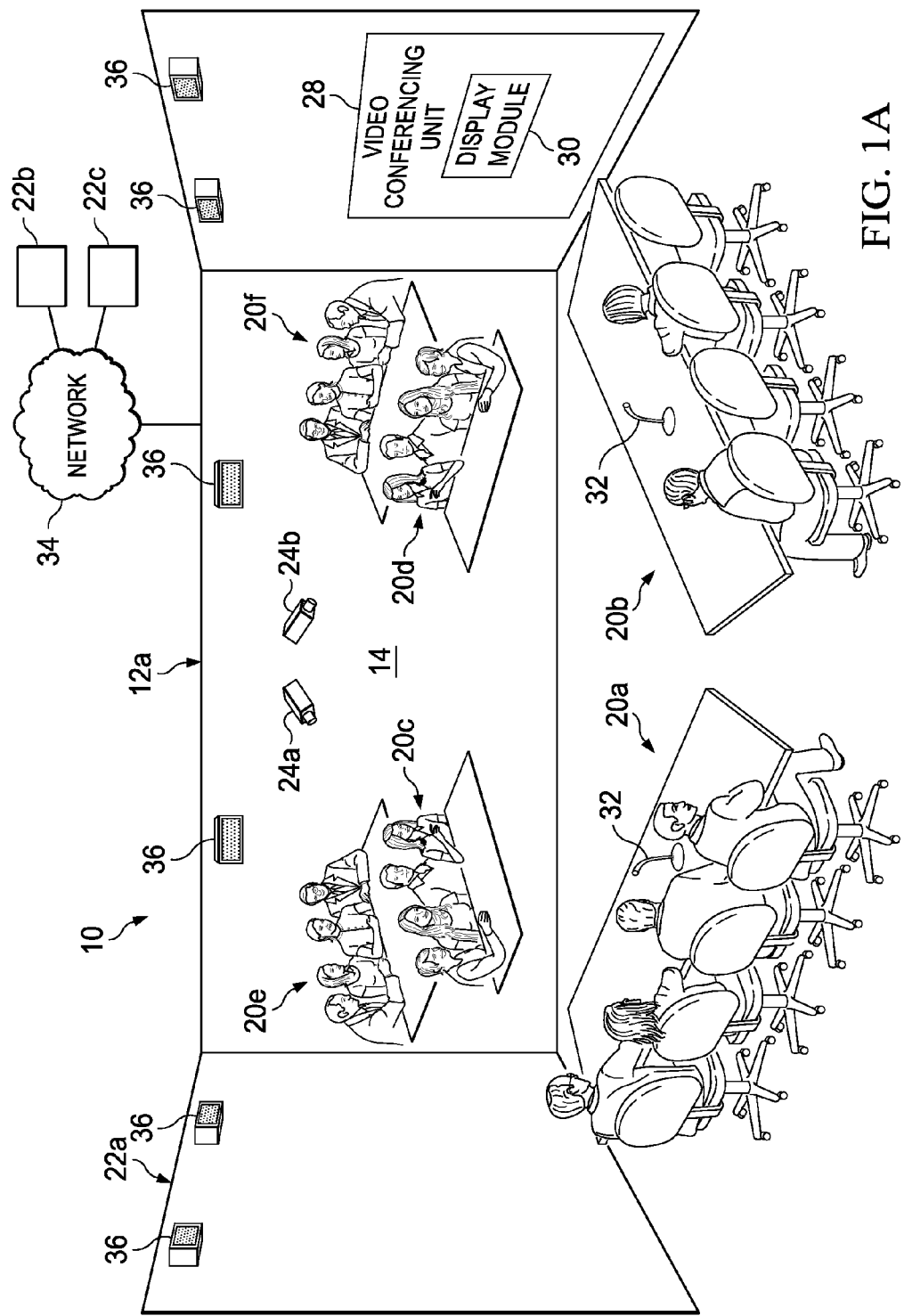
FIG. 1A is a simplified block diagram of a communication system for collaboration revelation and participant stacking in accordance with one example embodiment of the present disclosure.

Turning to FIG. 1A, FIG. 1A is a simplified block diagram of a system 10 for providing a video session in a network environment in accordance with one embodiment of the present disclosure. System 10 includes a local conference room 22a, remote conference rooms 22b and 22c, and a network 34. Local conference room includes a display screen 12a, participants 20a and 20b, cameras 24a and 24b, a video conferencing unit 28, and one or more speakers 36. Display screen 12a includes an image 14. Image 14 includes participants 20c-f. Video conferencing unit 28 includes a display module 30.

Video conferencing unit 28 is configured to display image 14, and one or more participants (e.g., participants 20c-f) on display screen 12a. Participants 20c-f may each be at a different remote location, at the same remote location, or some at a different remote location and some at the same remote location. Further, each participant 20a-f could be a single participant or a plurality of participants. In one example, in addition to being an endpoint, video conferencing unit 28 may contain a multipoint control unit (MCU), or may be configured to communicate with a MCU.

System 10 can be configured to organize a multi-purpose screen space to optimize the feeling of presence, and to focus the attention of participants on collaboration material or a presenter, while keeping an overview over all meeting participants in a multi-site situation. In one particular instance, system 10 may be configured to stack video segments of participants from multiple sites. More specifically, some video segments can be above and/or partially behind other video segments. Blending, shading, and/or audio effects can be used to make one or more of the video segments partly visible, while indicating grade of importance and/or distance. The stacking can also make the meeting scalable from one local meeting to two or more sites while providing good eye contact for the participants. The participants can be stacked in such a way as to keep the focus of attention on collaboration material or a presenter, which are in the center of display image 14 and surrounded by images of the meeting attendees.

For purposes of illustrating certain example techniques of system 10, the following foundational information may be viewed as a basis from which the present disclosure may be properly explained. Video conferencing allows two or more locations to interact via simultaneous two-way video and audio transmissions. The usability of systems for video conferencing and Telepresence needs to be able to serve multiple purposes such as connect separate locations by high quality two-way video and audio links, share presentations and other graphic material (static graphics or film) with accompanying audio, provide a means for live collaboration between participants in the separate locations, etc.

In video conferencing systems, it is desirable to see the other party on a display screen. The representation of participants from a separate location, for instance sitting at a meeting room table, is done by filming with a camera, mirroring the image, and reproducing the image on a screen locally. The reproduced image is like looking through a transparent boundary into another room. The layout of the reproduction can quickly become a challenge, especially with multiple sites that contain many participants. Similar challenges can also apply to the accompanying multichannel audio. Adding presentation material and the desire for collaboration can further add to the challenge.

Collaboration can include various ways of human interaction. One way to simplify the concept of collaboration is to think of it as pointing to, drawing on, and/or annotating presentation material (e.g., chart, graph, white board, video, PowerPoint presentation, text document, etc.). For collaboration over video conferencing and Telepresence, virtually sharing the presentation material is essential. Sharing the presentation material can be done by using a video screen that can show the same content in both rooms and provide means for pointing and annotation, for instance by having touch functionality. Because the participants working close to or on the collaboration screen are often the center of focus in the interaction, a natural and/or intuitively understandable representation of the participants and presentation material can be especially important.

However, capturing participants by camera and microphone in itself can be challenging, as participants move around and frequently turn different directions. In addition, the camera will invariably capture some content and material on the screen that is already represented separately. Even if the capture could be done well, reproduction on remote end sites can end up confusing, as the reproduction is a mirror image, or it is difficult to determine where the center of focus should be.

Solutions using a separate video stream for presentation material tend to reduce the feeling of presence for remote participants. The remote participants are trapped between the mirrored representation of participants looking at each other through a virtual transparent boundary and a non-mirrored representation of content and collaboration material on which they are working. Certain problems in these contexts include how to capture and represent the participants sharing a collaboration surface in an intuitively understandable way, how to combine and represent the different elements (participants, collaborating people, content, collaboration material) together in one meaningful, comprehensive and dynamic fashion, and how to organize a multi-purpose screen space to optimize the feeling of presence, all while keeping an overview over meeting participants in a multi-site situation. Multisite call scenarios with the option of multiple video streams from each site can add complexity to the layout.

In accordance with one example implementation, system 10 can separate the different elements on a display in an intuitively understandable fashion. In one example implementation, video segments of participants from multiple sites may be stacked above and/or partially behind each other. Blending and shading can be used to make one or more of the video segments partly visible, while indicating grade of importance and/or distance. Switching can be used to change the position of the displayed participants dynamically according to activity or importance, or the order and layout can be fixed or controlled manually. Tuning or calibrating the details of the layout and dynamic layout control can provide a way of seamlessly transitioning between the switching and active presence paradigms. Changes can be made using smooth animations. The effect can create a good compromise between having the main and/or active sites Telepresence style large and positioned in front with good eye contact and yet still keep a good overview of all participants in the meeting, while preserving screen area to be used for presenters and/or collaboration material.

The layout of the scene can be made locally if video conferencing unit 28 is capable of receiving multiple streams and making its own layout. A multi-stream video layout that makes all participants and/or sites visible can provide a good overview of the situation for participants in a multi-point conference, where pure switching would make only a few participants visible and "active presence" may detract from naturalness. Directional audio can enhance the understanding of the scene and aid perception.

Turning to the example infrastructure associated with present disclosure, display screen 12a offers a screen on which video data can be rendered for the participants. Note that as used herein in this Specification, the term 'display' is meant to connote any element that is capable of delivering image data (inclusive of video information), text, sound, audiovisual data, etc. to participants. This would necessarily be inclusive of any panel, plasma element, television (which may be high-definition), monitor, computer interface, screen, projector, Telepresence devices (inclusive of Telepresence boards, panels, screens, surfaces, etc.), or any other suitable element that is capable of delivering/rendering/projecting such information.

Network 34 represents a series of points or nodes of interconnected communication paths for receiving and transmitting packets of information that propagate through system 10. Network 34 offers a communicative interface between local conference room 22a and one or both remote conference rooms 22b and 22c, and may be any local area network (LAN), wireless local area network (WLAN), metropolitan area network (MAN), wide area network (WAN), VPN, Intranet, Extranet, or any other appropriate architecture or system that facilitates communications in a network environment.

Video conferencing unit 28 is a network element that can facilitate the video conferencing activities discussed herein. As used herein in this Specification, the term 'network element' is meant to encompass any of the aforementioned elements, as well as routers, switches, cable boxes, gateways, bridges, loadbalancers, firewalls, MCUs, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, video conferencing unit 28 includes software to achieve (or to foster) the video conferencing activities discussed herein. This could include the implementation of instances of display module 30. Additionally, each of these elements can have an internal structure (e.g., a processor, a memory element, etc.) to facilitate some of the operations described herein. In other embodiments, these video conferencing activities may be executed externally to these elements, or included in some other network element to achieve the intended functionality. Alternatively, video conferencing unit 28 may include software (or reciprocating software) that can coordinate with other network elements in order to achieve the video conferencing activities described herein. In still other embodiments, one or several devices may include any suitable algorithms, hardware, software, components, modules, interfaces, or objects that facilitate the operations thereof.

Figure 1B:
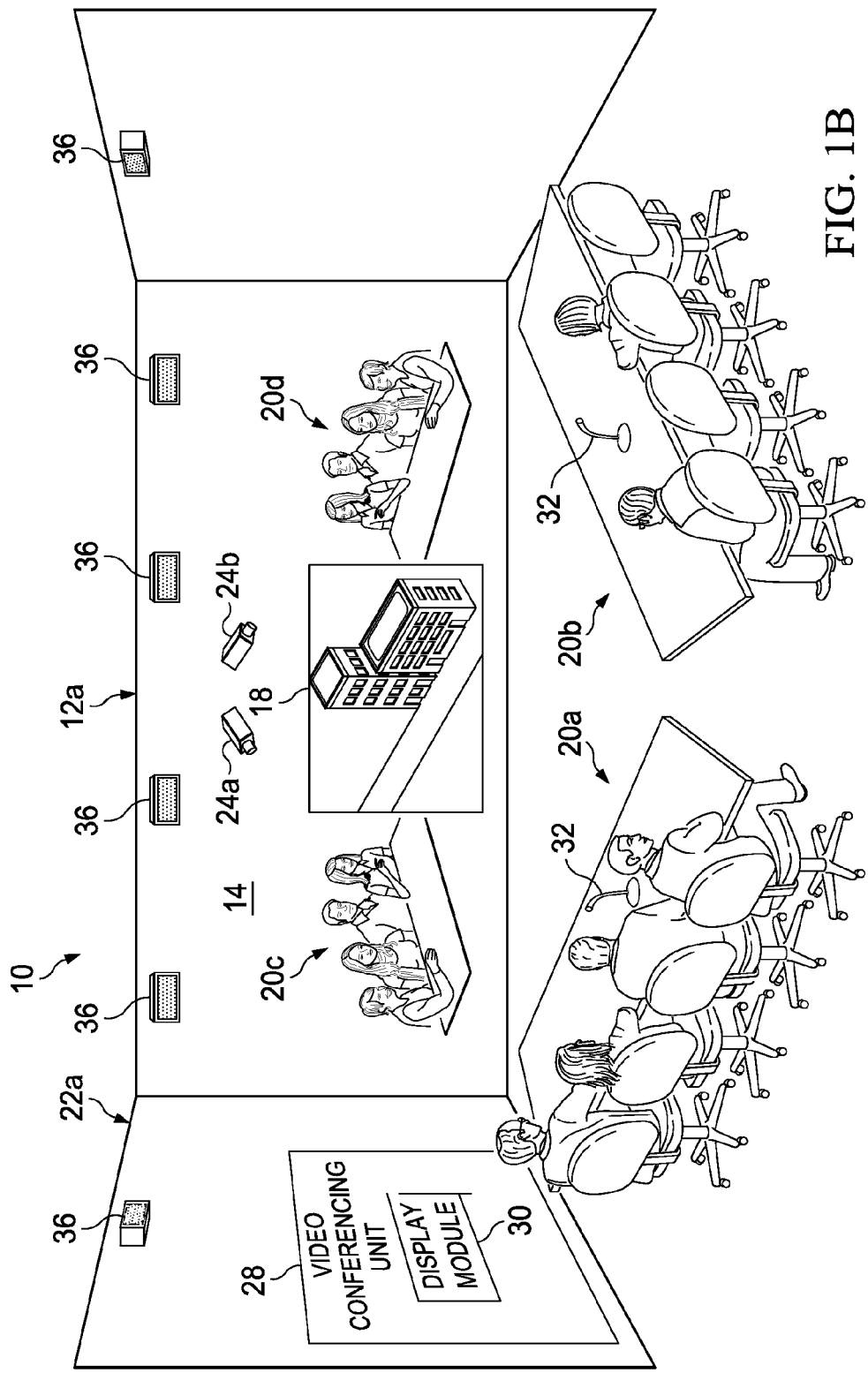
FIG. 1B is a simplified block diagram in accordance with another embodiment of the present disclosure.

Turning to FIG. 1B, FIG. 1B is a block diagram illustrating additional details associated with system 10. System 10 includes local conference room 22a. Local conference room includes display screen 12a, participants 20a, and 20b, and video conferencing unit 28. In one illustrative example, the representation or location of participants 20c and 20d in image 14 may be adjusted to accommodate and keep the center of attention on presentation material 18. More specifically, participants 20c and 20d may be moved from the center of image 14 to the sides of image 14 in order to make room for presentation material 18 in the middle of image 14 so all participants 20a-d can focus on presentation material 18. Presentation material 18 is systematically non-mirrored and shown in the center of the display at each remote site so each participant 20a-d can view presentation material 18 as if they were all in the same room. With the presentation material in the middle of the display at all sites, it is evident for the local participants 20a and 20b that the far end participants 20c and 20d are also looking at the presentation, thereby creating a virtual center of attention. Shared content can also be handled during collaboration, by all sites. This could involve, for instance, a touch sensitive wall area and a system detecting the presence of a person in front of that area. The transitions in (and out of) the presentation, where the participant images are moved to the sides, could be seamlessly animated.

One way to trigger the animation can be if someone simply steps close to the center part of the wall and a collaboration surface is produced (e.g., similar to a whiteboard) allowing for collaboration. The actual video of people (i.e., participants) can involve single streams of video from multiple sites, or multiple streams from a single site, or any suitable combination thereof. The arrangement of the different video streams (to the sides of the display) can be dependent on the room layouts and/or call scenario.

For example, one particular layout could involve a point-to-point scenario with dual video streams plus content. Tables can be optimized for the appropriate setting. The stage would be set for content. Cameras centered on top of the content area can be targeting the tables in the room. Participants looking at the content would, therefore, also be represented on the remote site with a strong probability for good eye contact. Since the camera and table is not necessarily aligned, it would show the table at an angle. When this is represented at the wall, it can appear as the tables are placed in a circle around the content. Note that the use of the idea is not limited to this room layout example. Neither is it limited to a large seamless pixel wall, as the principles discussed herein can be applied equally to multi-display systems. As discussed herein, directional audio can enhance the understanding of the scene and/or aid perception.

Figure 1C:
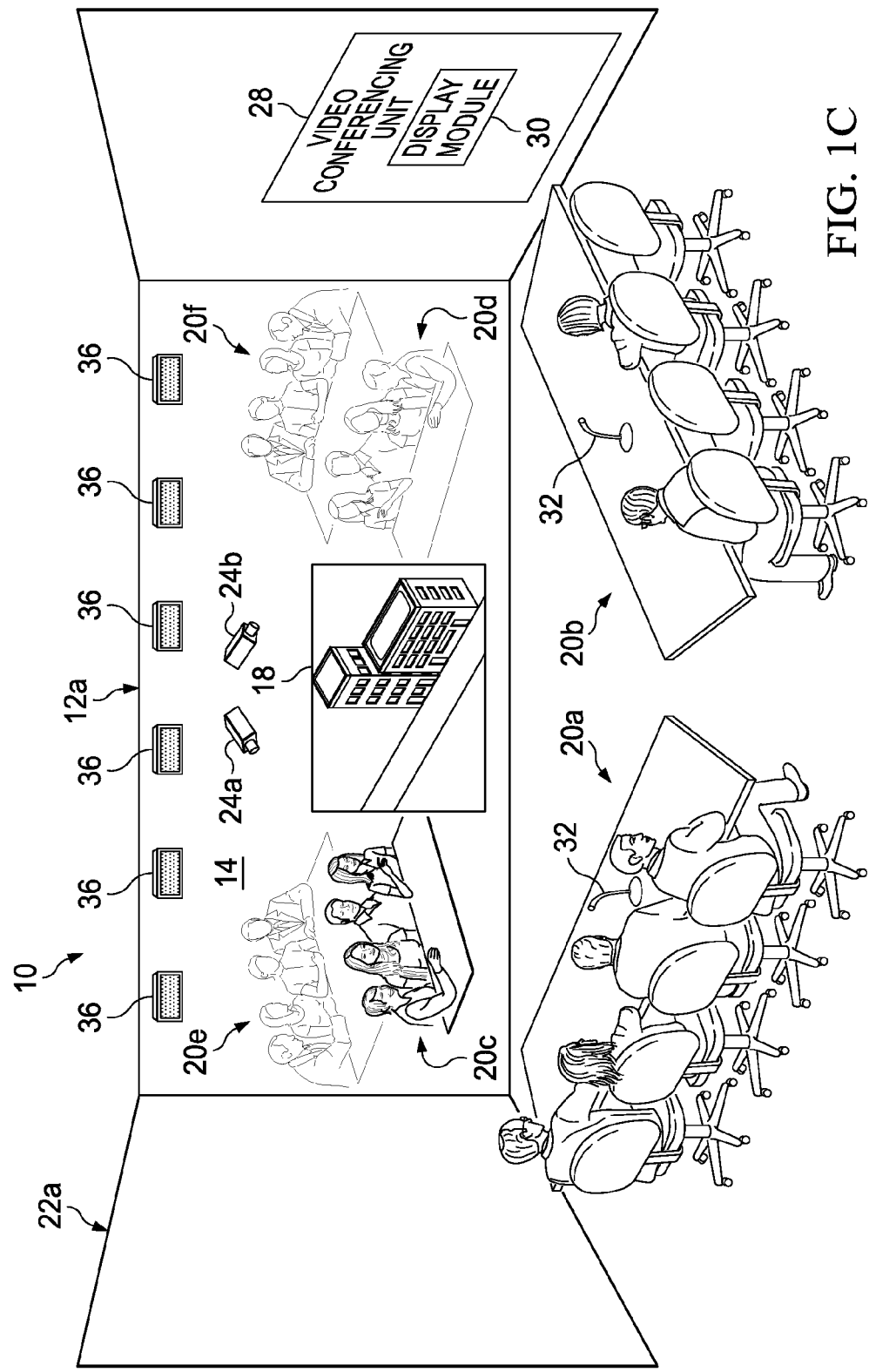
FIG. 1C is a simplified block diagram in accordance with another embodiment of the present disclosure.

Turning to FIG. 1C, FIG. 1C is a block diagram illustrating additional details associated with system 10. System 10 includes local conference room 22a. Local conference room 22a includes display screen 12a, participants 20a, and 20b, and video conferencing unit 28. In one illustrative example, the representation or location of participants 20c-e in image 14 may be adjusted to accommodate presentation material 18. More specifically, participants 20e and 20f may be stacked above and/or partially behind participants 20c and 20d. Blending and/or shading effects may be used on participants 20c-f to make them partly visible, while indicating grade of importance and/or distance, all the while keeping the focus of the presentation on presentation material 18. For example, to show depth and distance, participants 20e and 20f may be shaded lighter than and partially blended into participants 20c and 20d. In addition, participants 20c-f may be shaded lighter than presentation material 18 to keep the focus on presentation material 18. If participant 20c (or somebody in the group) has a question or is speaking, then participant 20c can be shaded darker than the other participants to focus the presentation on participant 20c.

Figure 2A:
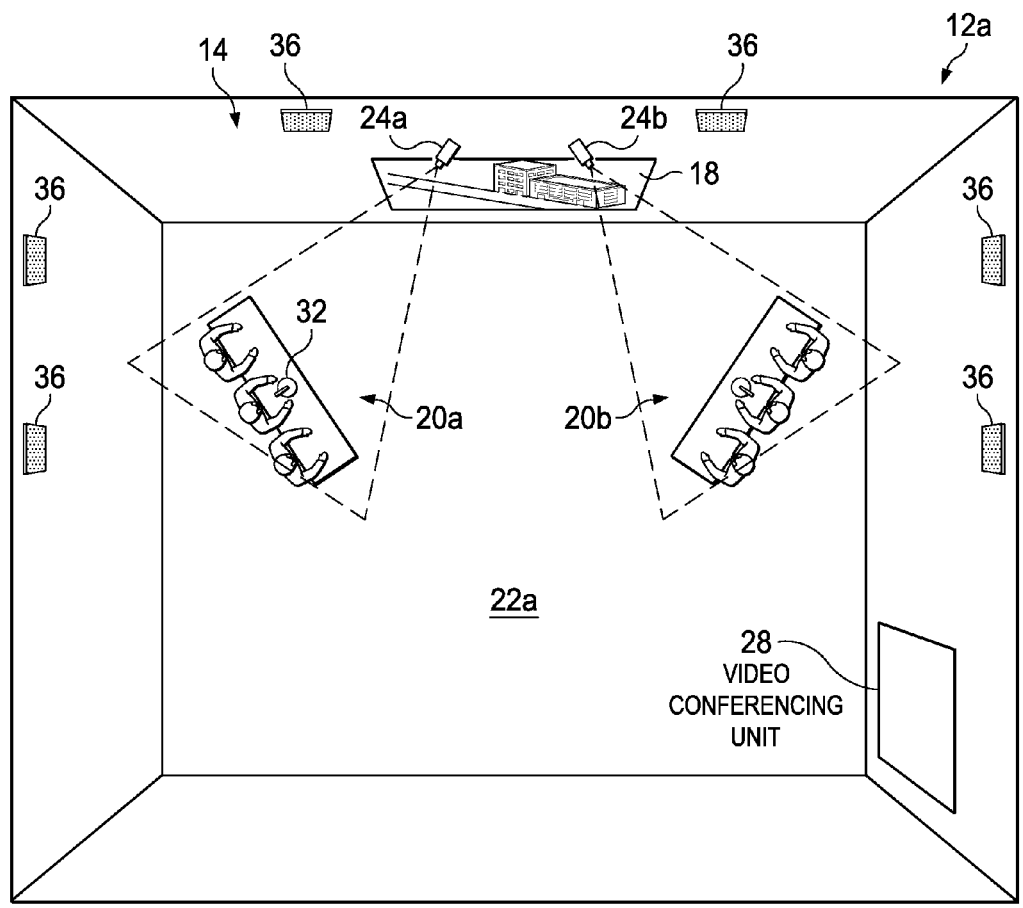
FIG. 2A is a simplified block diagram in accordance with another embodiment of the present disclosure.

Turning to FIG. 2A, FIG. 2A is a block diagram illustrating some of the potential arrangements and configurations for system 10. FIG. 2A includes local conference room 22a, which may include display screen 12a, participants 20a and 20b, cameras 24a and 24b, video conferencing unit 28, microphones 32, and a plurality of speakers 36. In an embodiment, display screen 12a may include cameras 24a and 24b and one or more speakers 36. In a particular implementation, cameras 24a-24b are positioned somewhat symmetrically in order to efficiently capture image data associated with the video conference. In addition, speakers 36 may be evenly distributed throughout this particular location, site, or room.

In one example, cameras 24a and 24b and one or more speakers 36 are separate from display screen 12a. Cameras 24a and 24b are configured to capture a video image of participants 20a and/or 20b in such a way that when reproduced, they appear to be looking into the middle of the meeting towards the presentation material 18. When all the participants attending the meeting are reproduced in such a manner, it can appear like the participants are in a circle around the middle of presentation material 18.

Turning to details associated with the infrastructure of system 10, in one particular example, cameras 24a and 24b are video cameras configured to capture, record, maintain, cache, receive, and/or transmit image data. This could include transmitting packets over network 34 to a suitable next destination. The captured/recorded image data could be stored in cameras 24a and 24b, or be provided in some suitable storage area (e.g., a database, a server, video conferencing unit 28, etc.). In one particular instance, cameras 24a and 24b can each be a separate network device and have a separate IP address. Each camera 24a and 24b can include a wireless camera, a high-definition camera, or any other suitable camera device configured to capture image data.

Cameras 24a and 24b may interact with (or be inclusive of) devices used to initiate a communication for a video session, such as a switch, video conferencing unit 28, a proprietary endpoint, microphone 32, a dial pad, a bridge, a telephone, a computer, or any other device, component, element, or object capable of initiating video, voice, audio, media, or data exchanges within system 10. Cameras 24a and 24b (and video conferencing unit 28) may also be configured to include a receiving module, a transmitting module, a processor, a memory, a network interface, a call initiation and acceptance facility such as a dial pad, one or more displays, etc. Any one or more of these items may be consolidated, combined, eliminated entirely, or varied considerably and those modifications may be made based on particular communication needs. Cameras 24a and 24b can include a high-performance lens and an optical zoom, where cameras 24a and 24b are capable of performing panning and tilting operations. The video and the audio streams can be sent from cameras 24a and 24b to video conferencing unit 28. An application program interface (API) can be used to control the operations of cameras 24a and 24b.

Video conferencing unit 28 is configured to receive information from cameras 24a and 24b (e.g., via some connection that may attach to an integrated device). Video conferencing unit 28 may also be configured to control compression activities, or additional processing associated with data received from cameras 24a and 24b. Alternatively, an actual integrated device can perform this additional processing before image data is sent to its next intended destination. Video conferencing unit 28 can also be configured to store, aggregate, process, export, or otherwise maintain image data and logs in any appropriate format, where these activities can involve a processor and a memory element. Video conferencing unit 28 can include a video element that facilitates data flows between endpoints and a given network. As used herein in this Specification, the term 'video element' is meant to encompass servers, proprietary boxes, network appliances, set-top boxes, or other suitable device, component, element, or object operable to exchange video information with cameras 24a and 24b.

Video conferencing unit 28 may interface with cameras 24a and 24b through a wireless connection, or via one or more cables or wires that allow for the propagation of signals between these elements. These devices can also receive signals from an intermediary device, a remote control, microphone 32, etc. and the signals may leverage infrared, Bluetooth, WiFi, electromagnetic waves generally, or any other suitable transmission protocol for communicating data (e.g., potentially over a network) from one element to another. Virtually any control path can be leveraged in order to deliver information between video conferencing unit 28 and cameras 24a and 24b. Transmissions between these devices can be bidirectional in certain embodiments such that the devices can interact with each other. This would allow the devices to acknowledge transmissions from each other and offer feedback where appropriate. Any of these devices can be consolidated with each other, or operate independently based on particular configuration needs. In one particular instance, cameras 24a and 24b are intelligently powered using a USB cable. In a more specific example, video data is transmitted over an HDMI link, and control data is communicated over a USB link.

Figure 2B:
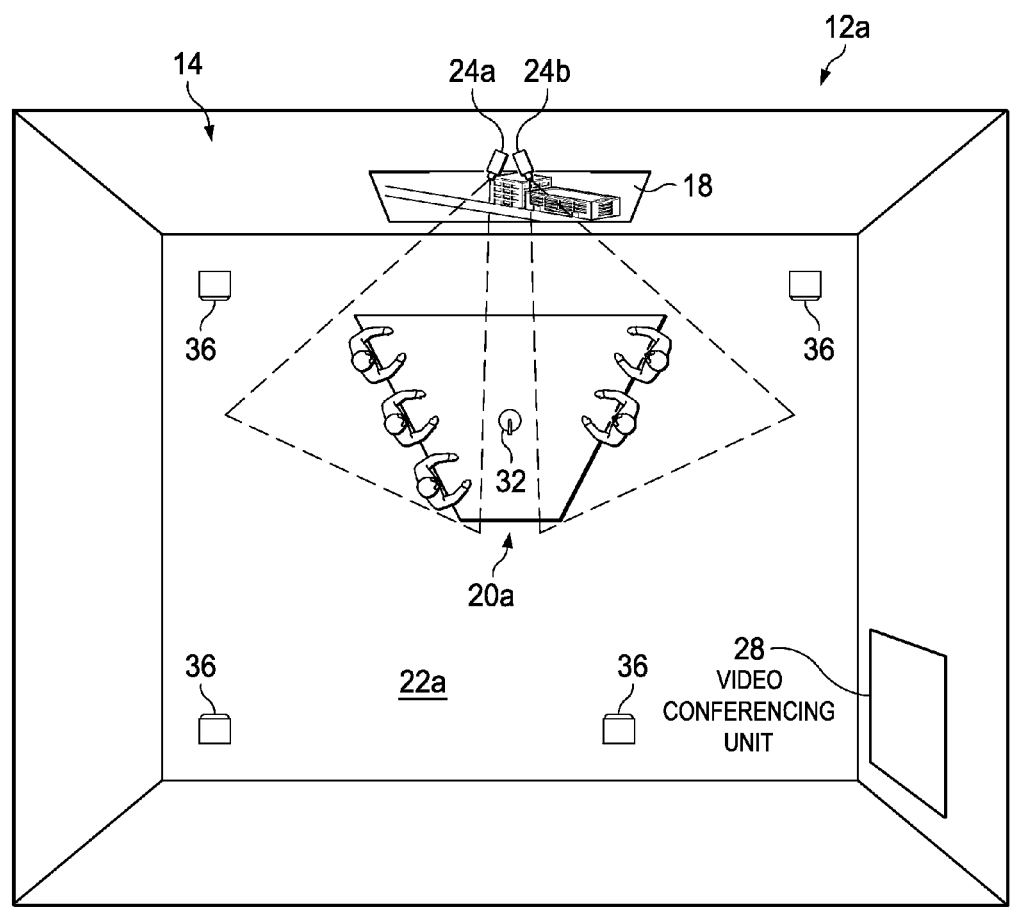
FIG. 2B is a simplified block diagram in accordance with another embodiment of the present disclosure.

Turning to FIG. 2B, FIG. 2B is a block diagram illustrating some of the potential arrangements and configurations for system 10. FIG. 2B includes local conference room 22a. Local conference room 22a includes display screen 12a, participants 20a, cameras 24a and 24b, video conferencing unit 28, microphone 32, and a plurality of speakers 36. Speakers 36 may be may be mounted above display screen, suspended from the ceiling of local conference room 22a, or free standing and proximate to display screen and/or the walls of local conference room 22a. In an embodiment, cameras 24a and 24b are proximate to display screen 12a. Cameras 24a and 24b are configured to capture a video image of participants 20a. Cameras 24a and 24b may be may be mounted above display screen, suspended from the ceiling of local conference room 22a, or free standing and proximate to display screen 12a.

Turning to FIG. 3A, FIG. 3A is a block diagram illustrating additional details associated with system 10, introduced in order to illustrate some of the potential arrangements and configurations for system 10. FIG. 3A illustrates a remote conference room (e.g., remote conference room 22b) that may be displaying a representation of local conference room 22a in FIG. 1B. FIG. 3A includes remote conference room 22b. Remote conference room 22b includes display screen 12b, participants 20c and 20d, and video conferencing unit 28 (located behind display screen 12b). Display screen 12b includes image 14. Image 14 includes presentation material 18 and participants 20a and 20b (from local conference room 22a). Because presentation material 18 is a non-mirrored image, participants 20a-d can feel like they are in the same room and view and interact with presentation material 18 as if they were in the same room.

Turning to FIG. 3B, FIG. 3B is a block diagram illustrating some of the potential arrangements and configurations for system 10. In one illustrative example, participants 20a and 20b are from local conference room 22a and participants 20e and 20f are from remote conference room 22c. Participants 20a-f can feel like they are in the same room when they view and interact with presentation material 18. Participants 20a, 20b, 20e, and 20f can be from multiple conference sites and some may be stacked above and/or partially behind others to preserve display screen 12b space for presentation material 18. This can be done in order to keep the focus on presentation material 18. Blending and/or shading of participants 20a, 20b, 20e, and 20f may be used to indicate grade of importance and/or distance. Such blending and/or shading can help provide a good overview of (and contact with) participants 20a, 20b, 20e, and 20f. Audio effects may further help enhance perception and the overview or connection with participants 20a, 20b, 20e, and 20f.

Figure 4:
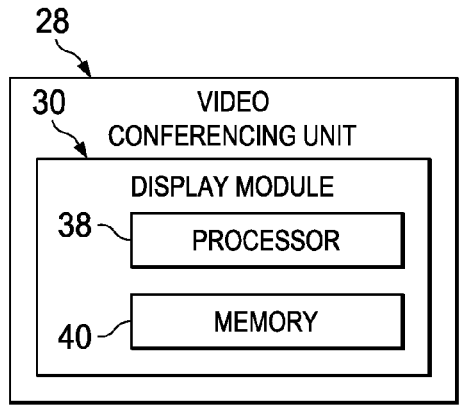
FIG. 4 is a simplified block diagram in accordance with another embodiment of the present disclosure.

Turning to FIG. 4, FIG. 4 is a block diagram illustrating additional details associated with system 10. Display module 30 includes a processor 38 and a memory 40. Display module 30 can be configured to organize screen space to optimize the feeling of presence, while keeping an overview over all meeting participants in a multi-site situation. The meeting participants may be shown in images that can be above and/or partially behind each other, with an optional use of blending, shading, and/or audio effects to make the participants partly visible, while indicating grade of importance and/or distance.

Figure 5:
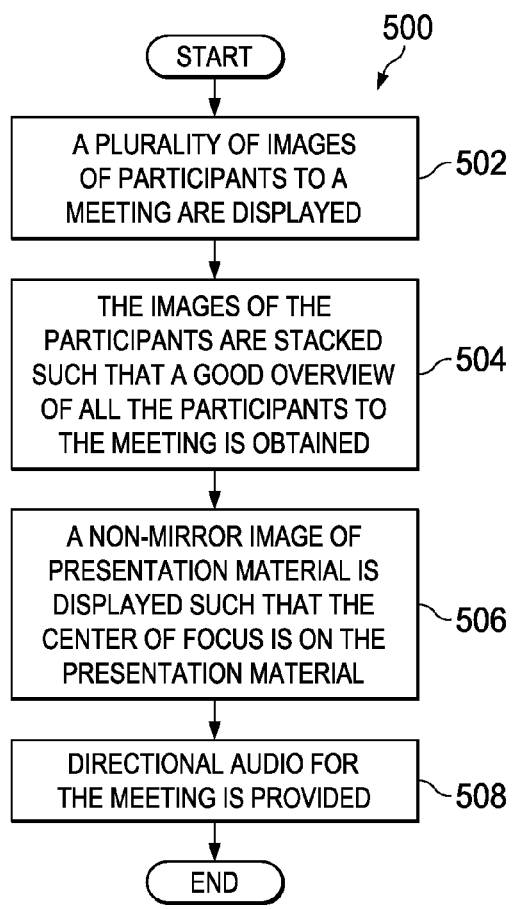
FIG. 5 is a simplified flowchart illustrating potential operations associated with the present disclosure.

Turning to FIG. 5, FIG. 5 is a simplified flowchart 500 illustrating one set of potential operation associated with the present disclosure. At 502, a plurality of images of participants to a meeting are displayed. At 504, the images of the participants are stacked such that a good overview of all the participants to the meeting is obtained. At 506, a non-mirror image of presentation material is displayed such that the center of focus is on the presentation material. At 508, directional audio for the meeting is provided.

As identified previously, a network device (e.g., video conferencing unit 28) can include software to achieve the video conferencing operations, as outlined herein in this document. In certain example implementations, the video conferencing functions outlined herein may be implemented by logic encoded in one or more tangible, non-transitory media (e.g., embedded logic provided in an application specific integrated circuit [ASIC], digital signal processor [DSP] instructions, software [potentially inclusive of object code and source code] to be executed by a processor [processor 38 shown in FIG. 4], or other similar machine, etc.). In some of these instances, a memory element [memory 40 shown in FIG. 4] can store data used for the operations described herein. This includes the memory element being able to store software, logic, code, or processor instructions that are executed to carry out the activities described in this Specification.

The processor can execute any type of instructions associated with the data to achieve the operations detailed herein in this Specification. In one example, the processor can transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the video conferencing activities as outlined herein. Additionally, each of these devices may include a processor that can execute software or an algorithm to perform the video conferencing activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that system 10 (and its teachings) are readily scalable and, further, can accommodate a large number of components, as well as more complicated/sophisticated arrangements and configurations. Accordingly, the examples provided should not limit the scope or inhibit the broad teachings of system 10, as potentially applied to a myriad of other architectures.

It is also important to note that the steps in the preceding FIGURES illustrate only some of the possible scenarios that may be executed by, or within, system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, the present disclosure has been described with reference to particular communication exchanges and system 10 may be applicable to certain exchanges and protocols in which data are exchanged in order to provide video conferencing operations. In addition, although system 10 has been illustrated with reference to particular elements and operations that facilitate the communication process, these elements and operations may be replaced by any suitable architecture or process that achieves the intended functionality of system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving video data associated with a meeting in a video-conferencing environment;
   displaying a plurality of images of participants such that an overview of the participants is rendered on a display;
   moving the plurality of images of the participants rendered on the display such that an image of a presenter or collaboration material is in a center of the display, wherein the collaboration material can be annotated by each of the participants, wherein at least some of the participants are at one or more locations, which are remote from the display; and
   providing directional audio for the meeting.

2. The method of claim 1, further comprising:
   stacking the plurality of images to create the overview of the participants of the meeting.

3. The method of claim 1, wherein a first image of a first one of the participants is partially behind a second image of a second one of the participants.

4. The method of claim 1, wherein the plurality of images are blended and shaded to indicate an importance thereof, or a distance from the display.

5. The method of claim 1, further comprising:
   displaying a non-mirror image of the collaboration material on the display.

6. The method of claim 1,
   configuring the middle portion of the display in a seamless transition in order to accommodate the presenter or the collaboration material.

7. The method of claim 1,
   wherein the directional audio for the meeting is to assist the participants in perception capabilities associated with the meeting.

8. The method of claim 1, wherein shared content of the meeting is accommodated during collaboration activities via a touch sensitive wall area.

9. The method of claim 8, wherein a presence of at least one of the participants in front of the display is detected during the collaboration activities.

10. Logic encoded in non-transitory media that includes instructions for execution and when executed by a processor, is operable to perform operations comprising:
    receiving video data associated with a meeting in a video-conferencing environment;
    displaying a plurality of images of participants such that an overview of the participants is rendered on a display;
    moving the plurality of images of the participants rendered on the display such that an image of a presenter or collaboration material is in a center of the display, wherein the presenter or the collaboration material are rendered near a middle portion of the display, wherein the collaboration material can be annotated by each of the participants, and wherein at least some of the participants are at one or more locations, which are remote from the display; and providing directional audio for the meeting.

11. The logic of claim 10, the operations further comprising:
stacking the plurality of images to create the overview of the participants of the meeting.

12. The logic of claim 10, wherein a first image of a first one of the participants is partially behind a second image of a second one of the participants.

13. The logic of claim 10, wherein the plurality of images are blended and shaded to indicate an importance thereof, or a distance from the display.

14. The logic of claim 10, the operations further comprising:
displaying a non-mirror image of the collaboration material on the display.

15. The logic of claim 10, the operations further comprising:
configuring the middle portion of the display in a seamless transition in order to accommodate the presenter or the collaboration material.

16. The logic of claim 10,
wherein the directional audio for the meeting is to assist the participants in perception capabilities associated with the meeting.

17. An apparatus, comprising:
a memory to store data; and
a processor to execute instructions associated with the data, wherein the processor and the memory cooperate such that the apparatus is configured to:
receive video data associated with a meeting in a video-conferencing environment;
display a plurality of images of participants such that an overview of the participants is rendered on a display;
moving the plurality of images of the participants rendered on the display such that an image of a presenter or collaboration material is in a center of the display, wherein the collaboration material can be annotated by each of the participants, and wherein the presenter or the collaboration material are rendered near a middle portion of the display, and wherein at least some of the participants are at one or more locations, which are remote from the display; and
provide directional audio for the meeting.

18. The apparatus of claim 17, the apparatus being further configured to:
stack the plurality of images to create the overview of the participants of the meeting.

19. The apparatus of claim 17, wherein a first image of a first one of the participants is partially behind a second image of a second one of the participants.

20. The apparatus of claim 17, wherein the plurality of images are blended and shaded to indicate an importance thereof, or a distance from the display.

* * * * *